(12) United States Patent
Flores Oropeza et al.

(10) Patent No.: US 9,587,182 B2
(45) Date of Patent: Mar. 7, 2017

(54) SYNERGISTIC FORMULATIONS OF FUNCTIONALIZED COPOLYMERS AND IONIC LIQUIDS FOR DEHYDRATED AND DESALTED OF MEDIUM, HEAVY AND EXTRA HEAVY CRUDE OILS

(75) Inventors: Eugenio Alejandro Flores Oropeza, Mexico City (MX); Laura Verónica Castro Sotelo, Mexico City (MX); Alfonso López Ortega, Mexico City (MX); José Gonzalo Hernández Cortez, Mexico City (MX); Fernando Alvarez Ramírez, Mexico City (MX); Arquímedes Estrada Martínez, Mexico City (MX); Flavio Salvador Vázquez Moreno, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 291 days.

(21) Appl. No.: 13/449,007

(22) Filed: Apr. 17, 2012

(65) Prior Publication Data

US 2012/0261312 A1   Oct. 18, 2012

(30) Foreign Application Priority Data

Apr. 18, 2011 (MX) .................... MX/a/2011/004120

(51) Int. Cl.
| | |
|---|---|
| *C10G 33/04* | (2006.01) |
| *C10G 29/20* | (2006.01) |
| *C10G 31/08* | (2006.01) |
| *B01D 17/04* | (2006.01) |

(52) U.S. Cl.
CPC ........... *C10G 33/04* (2013.01); *B01D 17/047* (2013.01); *C10G 29/20* (2013.01); *C10G 31/08* (2013.01); *C10G 2300/1033* (2013.01)

(58) Field of Classification Search
CPC .............................. C10G 29/20; C10G 33/04
USPC .................................. 208/187, 188, 291, 298
See application file for complete search history.

(56) References Cited

U.S. PATENT DOCUMENTS

| | | | |
|---|---|---|---|
| 5,401,439 A | 3/1995 | Elfers et al. | |
| 2006/0036057 A1 | 2/2006 | Lang | |
| 2008/0207780 A1 | 8/2008 | Wang | |
| 2009/0259004 A1 | 10/2009 | Newman et al. | |
| 2009/0306232 A1 | 12/2009 | Williams | |
| 2010/0140141 A1 | 6/2010 | Cendejas Santana et al. | |
| 2011/0186515 A1* | 8/2011 | Guimaraes et al. | 210/643 |

FOREIGN PATENT DOCUMENTS

WO   02/072737   9/2002

OTHER PUBLICATIONS

Guzman-Lucero, Diego et al., Ionic Liquids as Demulsifiers of Water-in-Crude Oil Emulsions: Study of the Microwave Effect, Energy & Fuels, vol. 24, Jun. 2010, pp. 3610-3615.*
Al-Sabagh, A.M. et al., Breaking water-in-crude oil emulsions by novel demulsifiers based on maleic anhydride-oleic acid adduct, Petroleum Science and Technology, 2002, vol. 20, Nos. 9 & 10, pp. 887-914.

* cited by examiner

*Primary Examiner* — Renee Robinson
(74) *Attorney, Agent, or Firm* — Dickinson Wright PLLC

(57) ABSTRACT

The present invention is related to formulations including one or more block copolymers with low polydispersity and bifunctionalized with amines, and an ionic liquid. A method of demulsifying, dehydrating, and desalting crude oils having API gravity ranging between 8 to 30 admixes the formulation with the crude oil in an amount effective to demulsify, dehydrate and/or desalt the crude oils.

21 Claims, 10 Drawing Sheets

SYNERGISTIC FORMULATIONS OF FUNCTIONALIZED COPOLYMERS AND IONIC LIQUIDS FOR DEHYDRATED AND DESALTED OF MEDIUM, HEAVY AND EXTRA HEAVY CRUDE OILS

CROSS-REFERENCE TO RELATED APPLICATION

This application claims the benefit under 35 U.S.C. §119 of Mexican Patent Application No. MX/a/2011/004120, filed Apr. 18, 2011, which is hereby incorporated by reference in its entirety.

FIELD OF THE INVENTION

This invention relates to the dehydration and desalting of medium, heavy and extra heavy crude oils, applying formulations prepared from functionalized copolymers (FC's) and ionic liquids (IL's).

BACKGROUND OF THE INVENTION

The crude oil emulsions are water dispersions of water droplets in crude oil, which cannot be grouped, due to the presence of surfactant molecules naturally present in petroleum. These emulsions are frequently encountered during petroleum production and in the reservoir or during refining, transport and storage.

These emulsions are undesirable not only because they cause serious problems in the refining of oil, but also significantly increase operating costs, producing difficulties in transportation and damage the equipment due to corrosion and fouling problems.

The demulsifiers most used today in the oil industry are: compounds of the alkylphenol-formaldehyde type, ethylene and propylene oxide copolymers, alkoxylated amines, alkoxylated epoxy resin, dissolved in one or more solvents such as xylenes, toluene, naphtha and short chain alcohols. The mechanism of action promotes coalescence of water droplets into larger droplets, which then flocculate thus achieving the separation of two phases. It has also been established that the function of a good demulsifier is to alter the rheological properties of the interfacial layer and destabilize the oil endogenous emulsifier layer. Usually, commercial demulsifiers are a mixture of several components with different polymer structures and a broad molecular weight distribution (Al-Sabagh A M et al 2002).

For example, U.S. Patent Publication No. 2009/0306232 discloses the use of formulations prepared from various aliphatic and aromatic anhydrides, especially acetic and propionic, and applied together with other demulsifiers as alkylphenol resins, alkoxylated amines, glycolic esterified resins, and derivatives thereof. The proportion of acetic anhydride can vary from 0.5% up to 99% by weight, without indicating the kind of oil treated, which indicates that only contains 15% water by volume. The formulations were prepared in aromatic solvents or alcohols (Williams D E, 2009)

U.S. Patent Publication No. 2009/0259004, discloses the use of formulations dissolved in aliphatic and/or aromatic alcohols, water, fatty acid esters, ethers and combinations thereof, consisting of polyethers, polyesters or polyurethanes polyesters, which are synthesized from a polytetramethylene glycol and alkylene glycol or an alkoxylated amine, joined by a carboxylic diacid or a diisocyanate, said combination was applied without specifying which oil. The above formulations are prepared by tetramethylene from 5% to 90% by alkyleneglycol from 1% to 50% and difunctional coupling agent from 5% to 90%. Another main feature is that these kinds of demulsifiers are biodegradable (Newman S P et al, 2009).

U.S. Patent Publication No. 2008/0207780 discloses a class of demulsifiers synthesized from polyacids and multiepoxides among others. The formulations that were found to be biodegradable were applied on ultra-light and heavy crudes (Wang W, 2008).

U.S. Patent Publication No. 2006/0036057 describes the use of formulations as demulsifiers in crude oil, bitumen, distillates and mixtures thereof; demulsifiers formulations are prepared by the reaction of one or more alkylphenol-formaldehyde resins and by one or more polyalkylene glycols, individually or mixture thereof with phosphorus compounds of phosphorus oxychloride, phosphorus pentoxide and phosphoric acid type. These formulations can be applied individually or in combination with other compounds known and applied in crudes with API gravity=15 (Lang F T, 2006).

U.S. Pat. No. 5,401,439 apply formulations of alkoxylates based on alkylphenol-formaldehyde resins, polyalkylenepolyamine and bisphenols, all of them propoxylated and ethoxylated, whose main characteristic is that their polydispersity has a minimum value of 1.7. The addition was performed in the concentration range of 1 ppm to 1000 ppm in crude oils of German origin without indicating its API gravity (Elfers G, et al 1995).

WO 02/072737 (Varadaraj R and Brons C H) (2002) discloses the application of formulations demulsifiers in crude oils with API gravities between 5 and 30, prepared from 10 and up to 80% by weight of aromatic compounds that have at least 2 aromatic rings, alkylated with linear and/or branching chains of at least 16 carbon atoms and an ether of dipropylene monobutyl type or diethylene glycol monobutyl in proportions ranging from 90% to 20%. The addition was performed at concentrations from 5 to 10000 ppm preferred range being from 20 to 40 ppm.

By the above and by economic and operational reasons it is important to remove water, as well as minimizing the water content also decreases the amount of salts and corrosion risks while optimizing the transport of oil through the ducts.

For years, in the Molecular Engineering Program, we have addressed the problem of dehydration and desalting of crude oil from different points of view and so far there have been three patent applications, two of them describe the use of formulations of triblock copolymers of polyethylene oxide-polypropylene oxide-polyethylene oxide type with molecular weights in the range from 1000 to 4000 Daltons and are bifunctionalized with amines, for demulsifier and dehydrate heavy oil, which water concentration content ranges from 5 to 50% by weight, preferably 5 to 40% by weight; and they succeeded water removal in the order of 30 to 80% and salts removal in the range of 30 to 65% of heavy oil. (Cendejas G, et al 2008, Cendejas G, et al 2009).

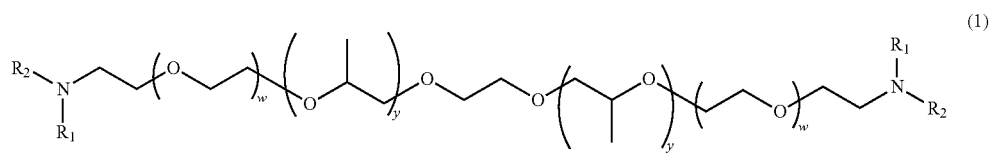
(1)

Preparation of Formulations Based on Block Copolymers of poly (ethylene oxide)$_w$-poly (propylene oxide)$_y$ and poly (ethylene oxide)$_w$, Bifunctionalized with acyclic amines

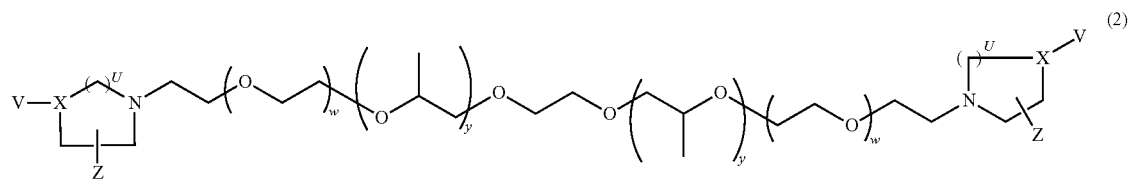
(2)

Preparation of Formulations Based on Block Copolymers of poly(ethylene oxide)$_w$-poly(propylene oxide)$_y$ and poly(ethylene oxide)$_w$, Bifunctionalized with cyclic amines Another patent application (MX/a/2011/003848), also as a result of our research, states the application of ionic liquids on an individual basis and formulation for demulsification, dehydration and desalting of median, heavy and extra heavy crude oils (API gravities between 8 and 20) and dehydrated efficiencies were achieved and desalting of the order of 90% and 76%, 90% and 71%, 90% and 71% respectively. The addition was performed at concentrations between 50 and 2000 ppm. (Table 1) (Flores E A, et al 2011).

TABLE 1

Demulsifiers formulations based ionic liquids for median, heavy and extra heavy crude oil (API gravities between 8 and 20).

C$^+$ (Cations)

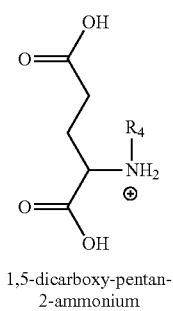

1,5-dicarboxy-pentan-2-ammonium

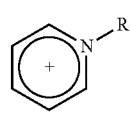

Pyridinium

TABLE 1-continued

Demulsifiers formulations based ionic liquids for median, heavy and extra heavy crude oil (API gravities between 8 and 20).

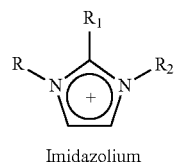

Isoquinolinium

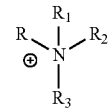

Imidazolium

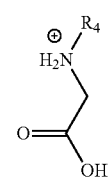

Ammonium

Carboxymethane-ammonium

A$^-$ (Anions)

R$_5$COO$^-$, Cl$^-$, Br$^-$, [BF$_4$]$^-$, [PF$_6$]$^-$, [SbF$_6$]$^-$, [R$_6$SO$_4$]$^-$, [OTs]$^-$, [OMs]$^-$, where: R, R$_1$, R$_2$ y R$_3$ are independent radicals represented by alkyl, cycloalkyl, benzyl, alkenyl or alkyl functionalized chains, between 1 and 10 carbon atoms; R$_4$ is hydrogen where R$_5$ is represented by alkyl, cycloalkyl, benzyl, alkenyl or alkyl functionalized chains, included between 1 and 18 carbon atoms; R$_6$ is represented by methyl and ethyl.

SUMMARY OF THE INVENTION

The present invention is directed to a formulation and to a method for demulsifying, dewatering and/or desalting light, medium, heavy and extra-heavy crude oils.

The formulation of the invention comprises a mixture of a poly(ethyleneoxide), (polypropyleneoxide), poly(ethyleneoxide) copolymer having a molecular weight of 400 to 800 Daltons and polydispersibility of 1.02 to 1.5, and an ionic liquid. The copolymer is bifunctionalized with an amine. The amine group can be obtained from a mono or disubstituted 2-alkyl-amino alcohol. The amine group can be a 5 or 6 member heterocyclic group having an oxygen or nitrogen heteroatom, or an acylic group that can be substituted or unsubstituted with an aromatic group and/or aliphatic group. The copolymers can have a molecular weight of 400 to 4400, preferably 400 to 800. In other embodiments, the functionalized copolymer can have a molecular weight of 1000 to 4000 Daltons. The copolymer preferably has a polydispersibility of 1.02 to 1.5. Examples of bifunctionalized block copolymers are illustrated in the formula 5a and 5b. The copolymers can have a molecular weight in the range of 400 to 4000 Daltons, and typically in the range of 800 to 4000 Daltons.

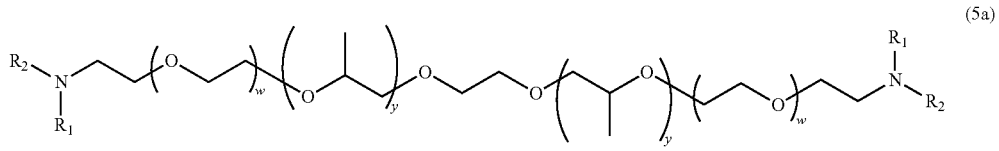

Where:
w and y numbers are in the range of 10 to 60, preferably 15 to 55, more preferably between 15 and 50.

$R_1$ and $R_2$ radicals are independently represented by the groups.

—H; —$CH_2(CH_2)_4B$; —CEGJ; —$CH_2$CHLM; —$CH_2(CH_2)_Q$M;

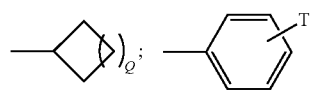

where: A is a number between 1 and 11, B is H.

E, G and J are independently a radical selected from the group consisting of: —H, methyl, ethyl, n-propyl, iso-propyl, sec-butyl, iso-butyl, tert-butyl, n-butyl, phenyl, cyclohexyl and cyclopentyl.

L is a radical represented by methyl and ethyl, and M is a hydroxyl group.

Q is a number between 1 and 5; T is represented by groups E, G and J where T is independently a radical selected from the group consisting of: —H, methyl, ethyl, n-propyl, iso-propyl, sec-butyl, iso-butyl, tert-butyl, n-butyl, phenyl, cyclohexyl, cyclopentyl, $NO_2$, Cl, F and Br.

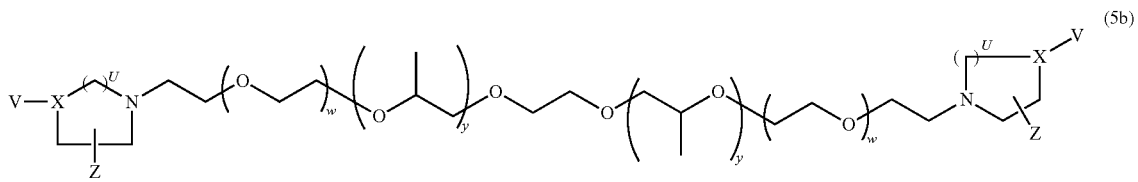

Where
W and y are as defined in Formula 5a.
U is a number between 1 and 2.
X is represented by atoms of oxygen and nitrogen, when X is nitrogen then V is represented by, -methyl, ethyl, n-propyl, iso-propyl, sec-butyl, iso-butyl, tert-butyl, n-butyl, phenyl, cyclohexyl, cyclopentyl, and benzyl.
Z is a mono- or di-substitution and is represented by methyl, ethyl, n-propyl, iso-propyl, sec-butyl, iso-butyl, tert-butyl, n-butyl, phenyl, cyclohexyl, cyclopentyl, benzyl and hydroxyl at any position of the 5 or 6 rings members.

The preferred amines of the present invention are: 2-(methylamino)-ethanol, 2-(butylamino)-ethanol, 2-(benzylamino)-ethanol, 2-(cyclohexylamino)-ethanol, 2-(tert-butylamino)-ethanol, 2-(phenylamino)-ethanol, 2-(n-propylamino)-ethanol, 2-(iso-propylamino)-ethanol, 2-(hydroxymethylamino)-ethanol, 2,2'-iminodiethanol, 1,1'-iminodi-2-propanol, 4-(butylamino)-1-butanol, 1-benzylpiperazine, 1-phenylpiperazine, 2-(hexylamino)-ethanol, 1-acetylpiperazine, 1-(orto-chlorophenyl)-piperazine, 1-ethylpiperazine, 1-(meta-tolyl)-piperazine, 1-(4-nitrophenyl)-piperazine, 4-benzylpiperidine, 4-methylpiperidine, 2-methylpiperidine, 2-ethylpiperidine, 3,5-dimethylpiperidine, piperidin-3-ol, piperidin-4-ol, trans-3,5-dimethylpiperidine, cis-3,5-dimethylpiperidine, 3-methylpiperidine, piperidin-3-ylmethanol, 3,3-dimethylpiperidine, 4-phenylpiperidin-3-ol, 4-phenyl-piperidine, 4-(piperidin-4-yl)morpholine, 4,4'-bipiperidine, pyrrolidin-3-amine, 2,6-dimethylmorpholine, morpholine, pyrrolidin-2-ylmethanol, trans-2,5-dimethylpyrrolidine, cis-2,5-dimethylpyrrolidine, diphenylamine, 2-nitro-diphenyl amine, 4-nitro-diphenylamine, pyrrolidine, 4,4'bis(dimethylamino)-diphenylamine, 2,4-dinitro-diphenylamine 4,4'-dimethoxy-diphenylamine, diethylamine, dipropylamine, dibutylamine, dipentylamine, dihexylamine, dioctylamine, didecylamine, didodecylamine, dinonylamine, N-methyl-hexylamine, di-iso-propylamine, N-iso-propyl-tert-butylamine, N-ethyl, -tert-butylamine, N-ethyl-butylamine, di-iso-butylamine, iso-butyl-sec-butylamine, di-iso-pentylamine, ethyl-n-dodecylamine, Bis(2-ethylhexyl)amine, di-tert-amyl-amine, N-methyl-pentylamine, N-methyl-butylamine, N-methyl-tert-butilamine, N-ethyl-iso-propylamine, N-ethyl-propylamine, N-methyl-octylamine, piperidine.

Examples of functionalized copolymers include α,ω-di(N-tert-butyl, N-ethanol)-amine-poly(ethylene oxide)$_w$-poly(propylene oxide)$_y$-poly(ethylene oxide)$_w$; α,ω-di-(N-ethyl, N-ethanol)-amine-poly(ethylene oxide)$_w$-poly(propylene oxide)$_y$-poly(ethylene oxide)$_w$; α,ω-di-Morpholinyl-poly(EG)$_w$-poly(ethylene oxide)$_w$-poly(propylene oxide)$_y$-poly(ethylene oxide)$_w$; α,ω-diamine-poly(ethylene oxide)$_w$-poly(propylene oxide)$_y$-poly(ethylene oxide)$_w$; α,ω-di-piperidinyl-poly(ethylene oxide)$_w$-poly(propylene oxide)$_y$-poly(ethylene oxide)$_w$; α,ω-di-pyrrolidinyl-poly(ethylene oxide)$_w$-poly(propylene oxide)$_y$-poly(ethylene oxide)$_w$; α,ω-bis-(N,N-diphenyl)-amine-poly poly(ethylene oxide)$_w$-poly(propylene oxide)$_y$-poly(ethylene oxide)$_w$; α,ω-di-(N-methyl, N-ethanol)-amine poly(ethylene oxide)$_w$-poly(propylene oxide)$_y$-poly(ethylene oxide)$_w$; α,ω-bis-(N,N-diethyl)-amine-poly(ethylene oxide)$_w$-poly(propylene oxide)$_y$-poly(ethylene oxide)$_w$; α,ω-bis-(N,N-dihexyl)-amine-poly(ethylene oxide)$_w$-poly(propylene oxide)$_y$-poly(ethylene oxide)$_w$; α,ω-bis-(N,N-dibenzyl)-amine-poly poly(ethylene oxide)$_w$-poly(propylene oxide)$_y$-poly(ethylene oxide)$_w$; α,ω-bis-(N-benzyl, N-butyl)-amine-poly(ethylene oxide)$_w$-poly(propylene oxide)$_y$-poly(ethylene oxide)$_w$; α,ω-di-(N-methyl)-piperazinyl-poly(ethylene oxide)$_w$-poly(propylene oxide)$_y$-poly(ethylene oxide)$_w$; α,ω-di-(4-phenyl)-piperazinyl-poly(ethylene oxide)$_w$-poly(propylene oxide)$_y$-poly(ethylene oxide)$_w$; α,ω-bis-(N,N-dibutyl)-amine-poly(ethylene oxide)$_w$-poly(propylene oxide)$_y$-poly(ethylene oxide)$_w$; α,ω-di-(N-butyl, N-ethanol)-amine poly(ethylene oxide)$_w$-poly(propylene oxide)$_y$-poly(ethylene oxide)$_w$; α,ω-di-(N-benzyl, N-ethanol)-amine poly(ethylene oxide)$_w$-poly(propylene oxide)$_y$-poly(ethylene oxide)$_w$; α,ω-di-(iminodiethanol)-amine poly(ethylene oxide)$_w$-poly(propylene oxide)$_y$-poly(ethylene oxide)$_w$; α,ω-di-(3-hydroxy)-piperidinyl poly(ethylene oxide)$_w$-poly(propylene oxide)$_y$-poly(ethylene oxide)$_w$.

Examples of copolymers and methods for producing the copolymers are disclosed in U.S. Patent Publication No. 2010/0140141, which is hereby incorporated by reference in its entirety.

The ionic liquids have a cation selected from the group consisting of 1,5-dicarboxy-pentane-2-ammonium, pyridinium, isoquinolinium, imidazolium, ammonium and ammonium carboxymethane, and an anion selected from the group consisting of $R_5COO^-$, $Cl^-$, $Br^-$, $[BF_4]^-$, $[PF_6]^-$, $[SbF_6]^-$, $[R_6SO_4]^-$, $[OTs]^-$, $[OMs]^-$, where $R_5$ is an alkyl, cycloalkyl, benzyl, alkenyl, aromatic, or allyl-functionalized chain having 1 and 18 carbon atoms; and $R_6$ is methyl or ethyl. Examples of suitable ionic liquids include triethylammonium, methanesulfonate, ethyltrihexylammonium bromide, IL-C (1,5-dicarboxy-pentane-2-ammonium methanesulfonate), IL-D (methyltripentylammonium bromide), IL-E (ethyltributylammonium ethylsulfate), IL-F (ethyldodecylimidazolium chloride) and IL-G (1,2-dimethylimidazolium methylsulfate).

The invention is also directed to a method of demulsifying, dewatering and/or desalting crude oil by admixing a formulation comprising a mixture of the polyethylene-polypropylene-polyethylene oxide copolymer having the amine functional groups defined above and an ionic liquid with the crude oil in an amount to demulsify, dewater and/or desalt the crude oil. The formulation can contain a solvent having a boiling point of 30° C. to 200° C. Each of the copolymers and ionic liquids can be present in the formulation in an amount of 1 to 50% by weight based on the total weight of the formulation. In one embodiment, the formulation can have equal amounts of the copolymer and ionic liquid.

The amount of the formulation is added to the crude oil in an amount effective to demulsify, dewater and/or desalt the crude oil. The copolymer and ionic liquid can be added in equal amounts or in different amounts. Each of the copolymers and ionic liquids can be added to the crude oil in amounts of about 5 ppm to 3000 ppm, preferably 50 ppm to 1500 ppm, and more preferably 100 ppm to 1000 ppm based on the amount of crude oils. In one embodiment, the copolymer and ionic liquid are added in amounts of about 200 ppm to 500 ppm.

DESCRIPTION DETAILED OF THE INVENTION

Figure 1:
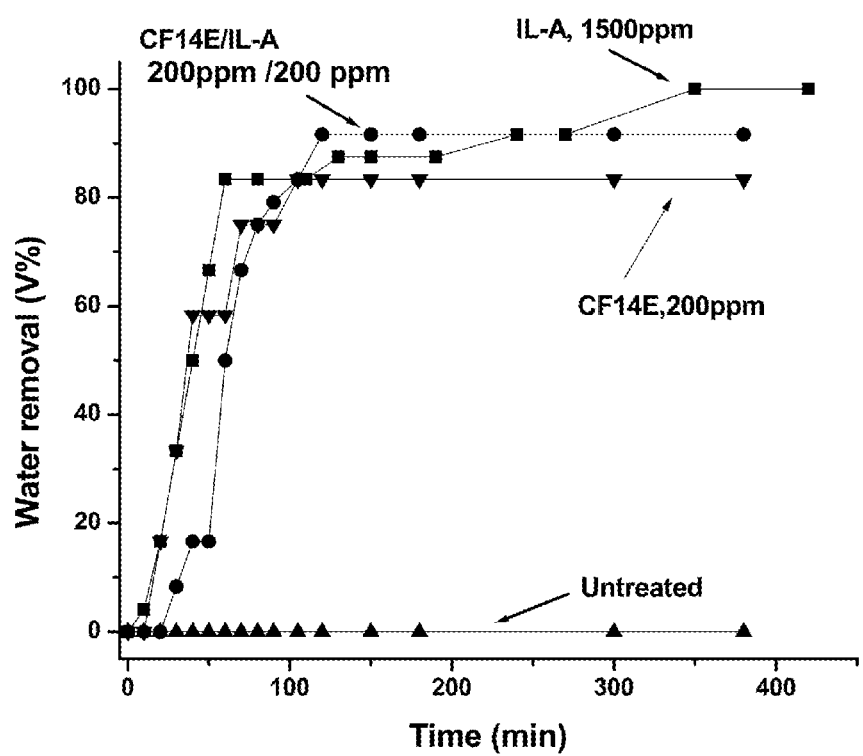
FIG. 1 is a graph of water removal rate versus time, showing the activity of the demulsifier formulation IL-A (triethylammonium methanesulfonate) and CF14E (Mn=2200), on crude oil type Akal (19.8 API°).

Considering the foregoing, and with the purpose of efficiently dehydrating and desalinating medium, heavy and extra heavy crudes oils using in addition lower concentrations of additives; we proceeded to prepare synergistic formulations from our inventions of ionic liquids (IL's) (individually or in formulation) and formulations of triblock copolymers (CF's) of polyoxyethylene-polyoxypropylene-polyoxyethylene with molecular weights in the range of 400 to 4400 Daltons, preferably 800 to 4000 Daltons, and more preferably 1000 to 4000 Daltons, which are bifunctionalized with amines (Cendejas G, et al 2008, Cendejas G, et al 2009, Flores E A, et al 2010). In one embodiment, the copolymer has a molecular weight of 400 to 800 Daltons.

Formulations based on CF's and IL's were evaluated in crudes oil, having gravities are between 8 and 30° API, and preferably 9 and 30° API; their full characterization is described below (Table 2):

The evaluation procedure is described below: the number of provided graduated bottles with seal and lid, is indicated by the number of compound to evaluate, one more which it corresponds to the crude one without additive; in each one of them the crude was added until 100 milliliters mark. All the bottles were placed in a water bath with temperature controlled at 80° C. for 20 minutes, at the end of this time is added one aliquot of the dissolution of IL's (individual or formulations), FC's and copolymers of commercial formulations mentioned above, all the bottles were shaken for 3 minutes at the rate of 2 blows per second. After being purged, they were placed again in the bath at controlled temperature and the rupture of the emulsion water in oil was followed each 5 minutes during the first 60 minutes, every 10 minutes during the second hour, and finally every hour until the end of the test.

By way of demonstration, that does not imply any limitation, are shown in FIGS. 1-10 the graphic results of the evaluation described above, for different formulations based on CF's and IL's.

TABLE 2

Physicochemical characteristics of evaluated crudes.

| | | | RESULTS | | | |
|---|---|---|---|---|---|---|
| PARAMETER | METHOD | UNIT | Medium AKAL | Heavy TEKEL | Heavy Mixture M + T* | Extra-heavy BACAB |
| API° | ASTM-D-287 | °API | 19.8 | 14.84 | 17.1 | 9.2 |
| Salt | ASTM-D3230 | lbs/1000bls | 2100** | 62** | 2600** | 8825** |
| Wax | UOP46 | % wt | 3.0 | 2.12 | 4.57 | 4.24 |
| Water | ASTM-D-4006 | % Vol | 10.0 | 2.0 | 10.0 | 45 |
| Kinematic Viscosity | ASTM-D-445 | mm$^2$/s | 303 | 1783.35 | 777.1 | 22660.3 |
| Pour point | ASTM-D-97 | ° C. | <−42 | *** | −33 | +6 |
| n-Heptane insoluble | ASTM-D-3279 | % wt | 9.8 | 20.45 | 11.85 | 10.4 |
| Saturates | ASTM-D-2007-91 | % wt | 31.6 | 29.30 | 34.33 | 32.0 |
| Aromatics | ASTM-D-2007-91 | % wt | 20.6 | 21.46 | 20.42 | 22.8 |
| Resins | ASTM-D-2007-91 | % wt | 35.9 | 25.15 | 31.72 | 28.0 |
| Asphaltenes | ASTM-D-2007-91 | % wt | 11.9 | 24.09 | 13.53 | 17.2 |

*This oil was prepared by mixing 6 volumes of Maya crude oil and 1 volume of Tekel.
**Values outside method, dilutions were made to obtain these values.
*** Crude oil too heavy, outside method Evaluation of the Formulations of CF's and IL's as Demulsifier, Dehydrating and Desalting Agents in Median, Heavy and Extra-heavy Crude Oil.

Different concentrated dissolutions were prepared from each one of CF's and IL's, from 5 to 40% by weight, using solvents whose boiling point are in the range of 35° C. to 200° C. Examples of suitable solvents include dichloromethane, methanol, ethanol, isopropanol, chloroform, benzene, toluene, xylene, jet fuel, naphtha, individually or in mixtures of them, so that small volumes of the dissolution were added in order to avoid the influencing effect of the solvent in the rupture of the emulsion. Formulations based on CF's and IL's were evaluated in concentrations between the range from 50 to 3000 ppm Rupture Efficiency in Water/Oil Emulsion Evaluation in Medium Crude Oil FIG. 1 shows that IL-A dosed at 1500 ppm, removed water with an efficiency of 96%, in other hand the CF-14E additive at 200 ppm removes 81% of water, however it is remarkable the synergism between both compounds, when each one are added formulated at concentrations of 200 ppm, they achieved to remove the water with an efficiency of 91%. This represents a greater efficiency compared to individual CF, and a considerable decrease in concentration of the ionic liquid.

Figure 2:
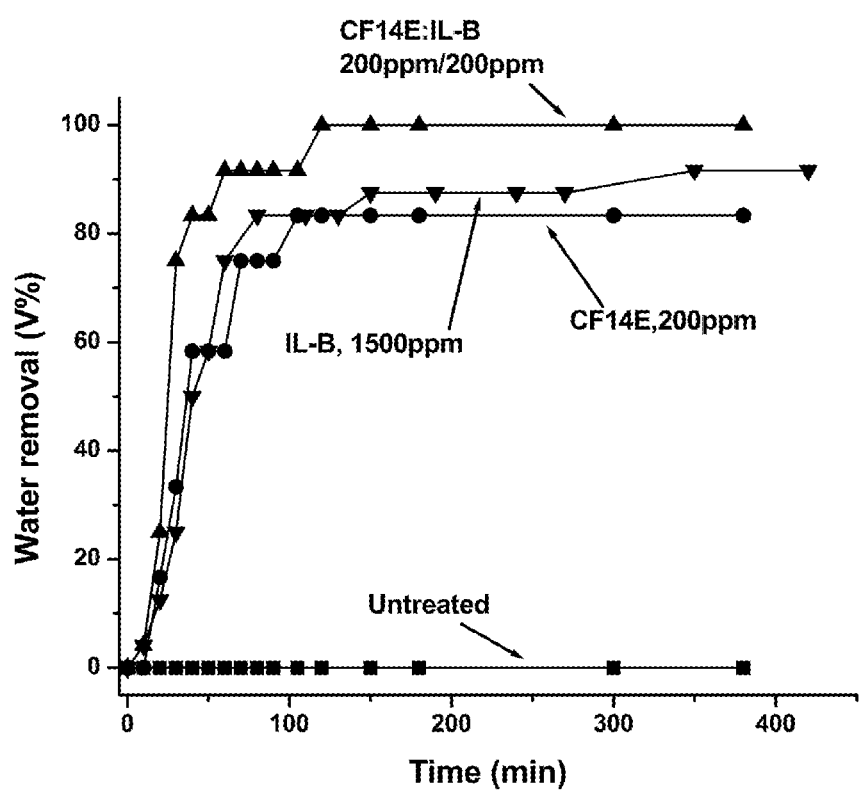
FIG. 2 is a graph of water removal rate versus time, showing the activity of the demulsifier formulation IL-B (ethyltrihexylammonium bromide) and CF14E (Mn=2200), on crude oil type Akal (19.8 API°).

In FIG. 2, it is observed that CF-14E and IL-B, dosed at 200 ppm and 1500 ppm, remove water with efficiencies of 81% and 88% respectively, but when they are formulated each one at concentration of 200 ppm, efficiency achieved is 98%, this represents a significant improvement compared to CF and decrease in the applied concentration of IL.

Evaluation in Heavy Crude Oil

Figure 3:
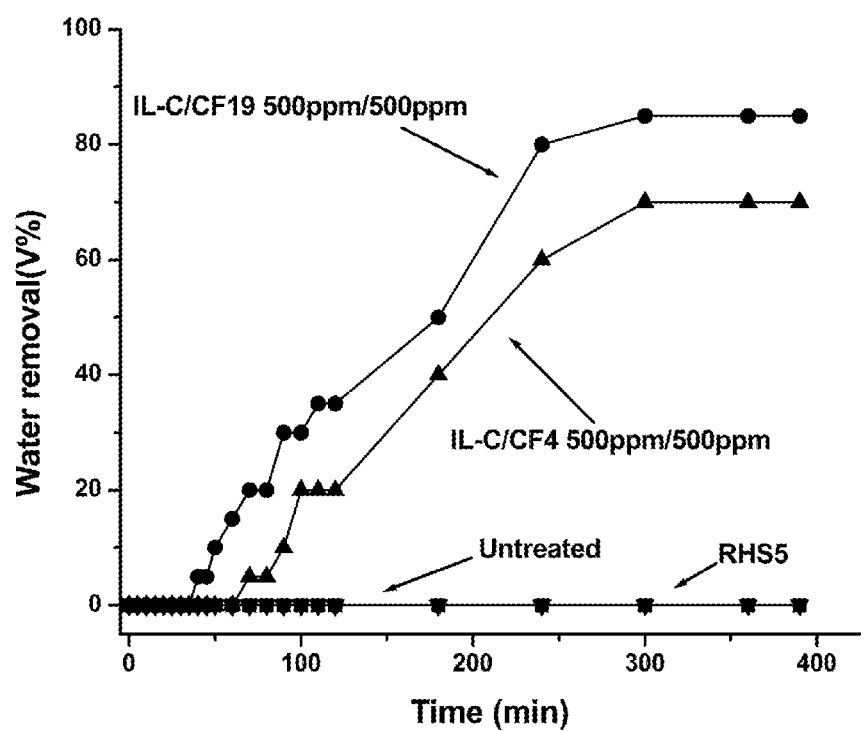
FIG. 3 is a graph of water removal rate versus time, showing the activity of the formulations demulsifier IL-C (1,5-dicarboxy-pentane-2-ammonium methanesulfonate) and CF4 and CF19 (Mn=2200), on a crude oil mixture of M+T (17.1) API°).

FIG. 3 exemplifies the demulsification efficiencies of two different formulations using the IL-C and two different CF's. Before it is necessary to clarify, that both CF's as IL-C were evaluated individually at concentrations of 200 ppm and 1500 ppm, respectively, and reached efficiencies of around 35%; also was evaluated a commercial formulation owned of IMP (RHS-5) which is composed with breakers, coalescers and clarifiers polymers, in concentrations of 500 and 1000 ppm, achieving zero efficiency. No results corresponding to them were included in the graph in order to facilitate visualization of the same. It is remarkable the synergism between the formulations with CF-19, CF-4 and IL-C, the efficiencies achieved are on the order of 85% and 70% respectively, that representing a significant improvement in water removal, when they are compared with individual efficiencies, and also represents a significant reduction in the concentration of IL-C, reducing from 1500 ppm to 500 ppm of additive. Additionally, the formulations shown in this invention are much better than the commercial formulation RHS-5 when is applied to this type of heavy crude oil.

Evaluation in Extra-Heavy Crude Oil

Considering that in the National Refineries System, there is a growing tendency of processing crudes with decreasing API gravity, it was emphasized the demulsifier research in this kind of crudes, with formulations composed by CF's and IL's, subject of the present invention. The results exemplified below represent an illustration and in no way a limitation.

Figure 4:
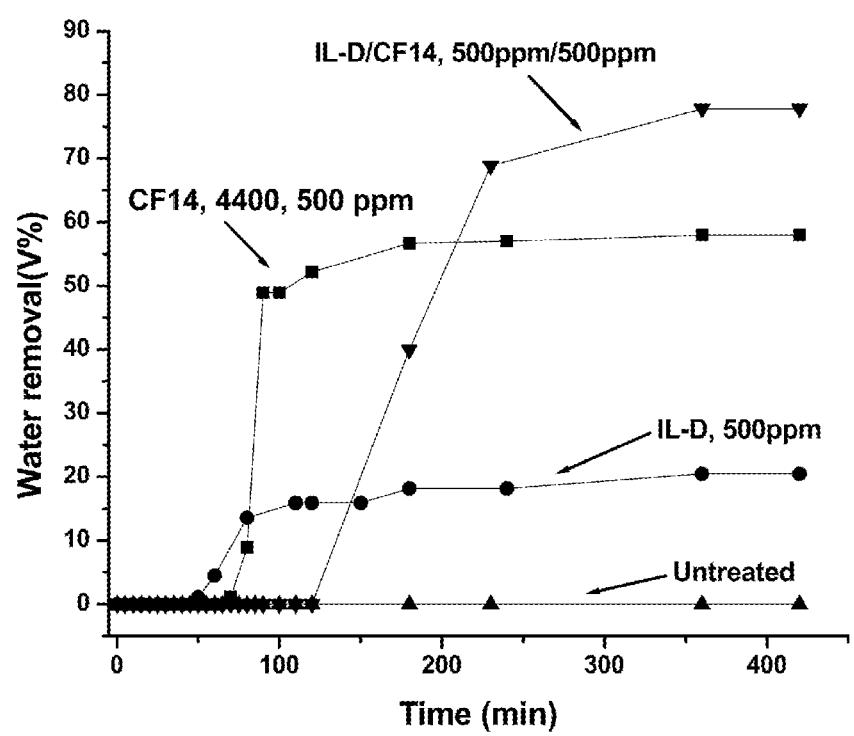
FIG. 4 is a graph of water removal rate versus time, showing the activity of the demulsifier formulation IL-D (methyltripentylammonium bromide) and CF14 (Mn=4400), on crude oil type Bacab (9.2 API°).

FIG. 4 shows the ability to break the emulsion of IL-D, CF-14 and the formulation composed by both. When the IL-D was added at 500 ppm water removed is about 20%, and when is added CF-14 (Mn=4400 Daltons) the removal efficiency is 55%, but when the formulation is added, the elimination of water reaches 78% efficiency.

Clearly, is observed the formulation synergism, since the removal of water is greater than the individual application of each component thereof.

Figure 5:
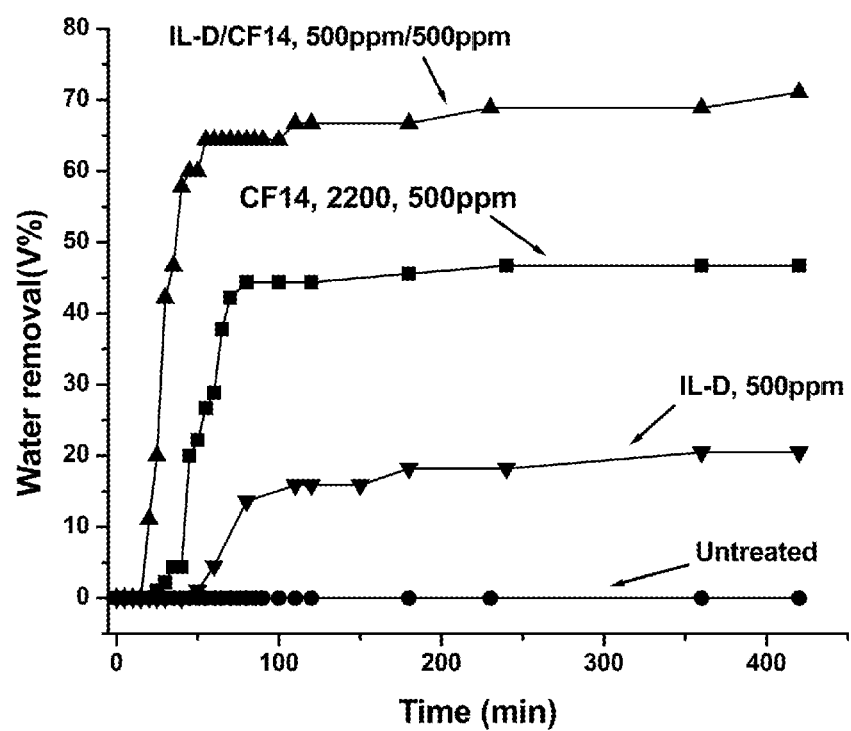
FIG. 5 is a graph of water removal rate versus time, showing the activity of the demulsifier formulation IL-D (methyltripentylammonium bromide) and CF14 (Mn=2200), on crude oil type Bacab (9.2 API°).

FIG. 5 shows the efficiencies in the rupture of the emulsion, when are applied IL-D, CF-14 (Mn=2200 Daltons) and the formulation of both. The IL-D and FC-14, have achieved alone efficiencies of 20% and 45% respectively. When they are combined, a synergism is achieved in the formulation, since their efficiency is 70%.

Also is observed that the formulation broke the emulsion in a shorter time (40 minutes) compared to CF-14 (60 minutes) and the IL-D (80 minutes).

Figure 6:
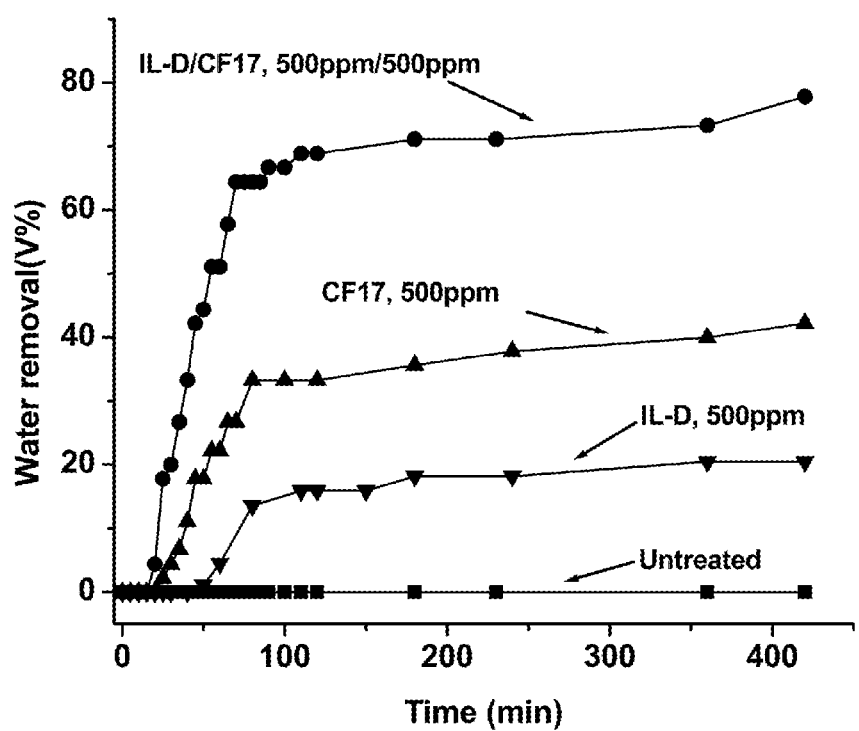
FIG. 6 is a graph of water removal rate versus time, showing the activity of the demulsifier formulation IL-D (methyltripentylammonium bromide) and CF17 (Mn=2200), on crude oil type Bacab (9.2 API°).

FIG. 6 shows the results of water removal when applying IL-D (500 ppm), CF17 (Mn=2200, 500 ppm) and their formulation (500 ppm/500 ppm). The efficiencies obtained are 20%, 40% and 70% respectively, again the formulation shows synergism. Also the formulation breaks the emulsion before that any of its components individually added.

Figure 7:
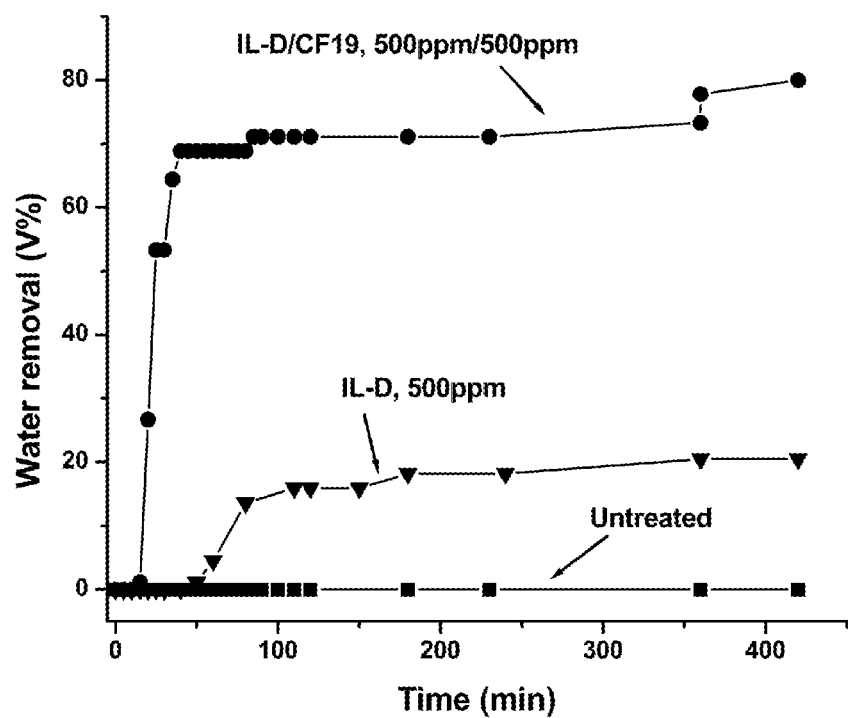
FIG. 7 is a graph of water removal rate versus time, showing the activity of the demulsifier formulation IL-D (methyltripentylammonium bromide) and CF19 (Mn=2200), on crude oil type Bacab (9.2 API°).

FIG. 7 shows the behavior of the breaking of the emulsion with respect to time, when IL-D (500 ppm), CF19 (500 ppm) and their formulation (IL-D and CF19 both in a ratio of 500 ppm/500 ppm) were added to the emulsion. The efficiencies obtained were of 20%, 40% and 80%, respectively. Once again the formulation breaks the emulsion before that any of its components individually applied.

Figure 8:
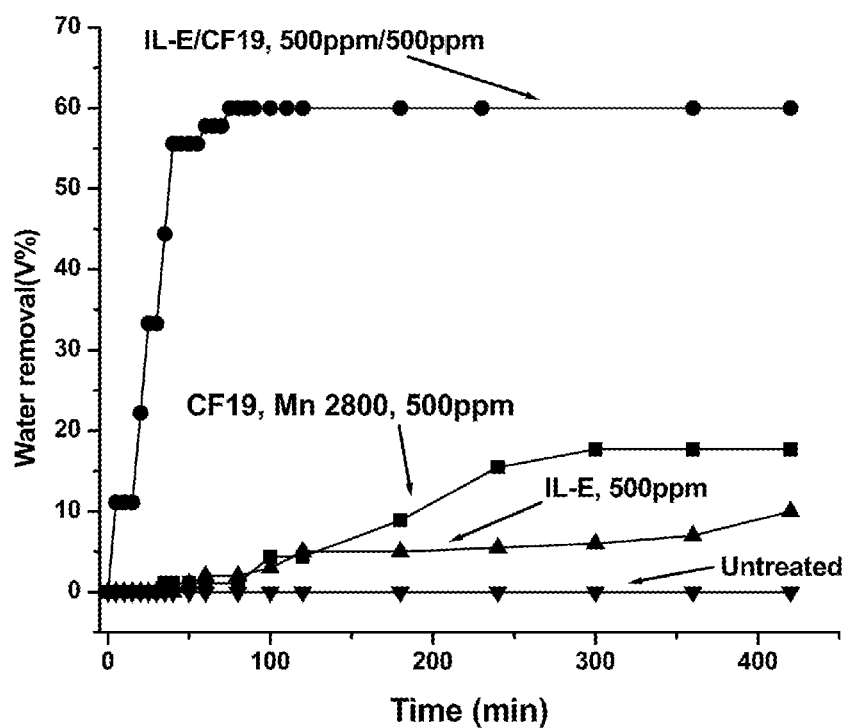
FIG. 8 is a graph of water removal rate versus time, showing the activity of the demulsifier formulation IL-E (ethyltributylammonium ethylsulfate) and CF19 (Mn=2800), on crude oil type Bacab (9.2 API°).

FIG. 8 shows that the formulation of the IL-E and CF-19 removes water in 60%, which is superior to the individual efficiencies of the components, since they removes water in a 10% (IL-E, 500 ppm) and 17% (CF-19, Mn=2800 Daltons, 500 ppm), respectively.

Figure 9:
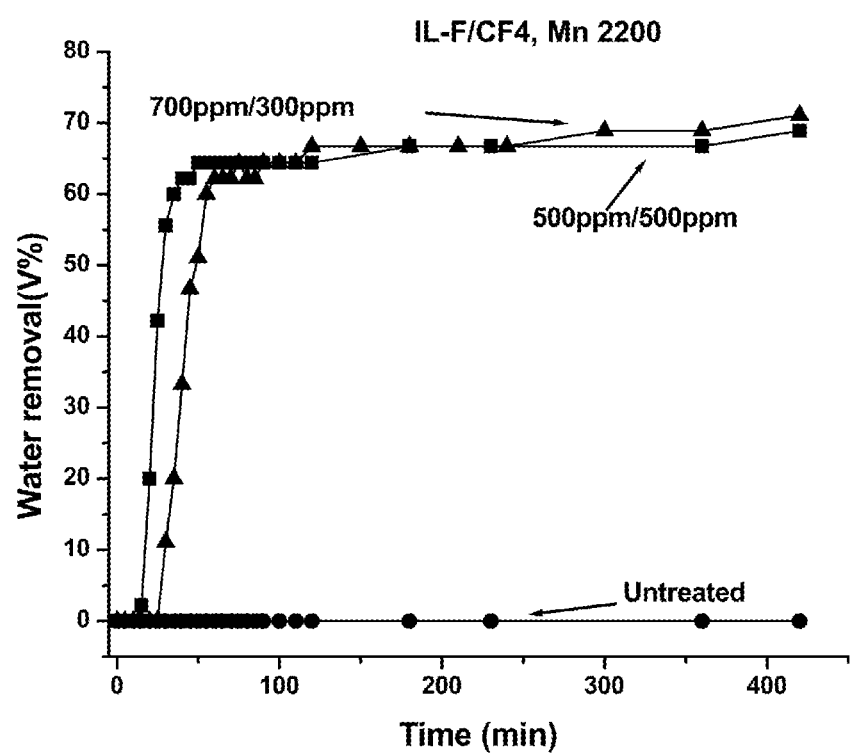
FIG. 9 is a graph of water removal rate versus time, showing the activity of the demulsifier formulation IL-F (ethyldodecylimidazolium chloride) and CF4 (Mn=2200), on crude oil type Bacab (9.2 API°).

FIG. 9 shows the efficiency in the breaking of the emulsion when two formulations of IL-F and CF-4 (Mn=2200 Daltons) are added in different concentrations. Both formulations achieve similar efficiencies from 50 minutes (63%) and hold so until the end of the test, when they reach 68-70% efficiency. It is important emphasize that the individual addition of the components of the formulation (500 ppm), achieve efficiencies close to 35%.

Figure 10:
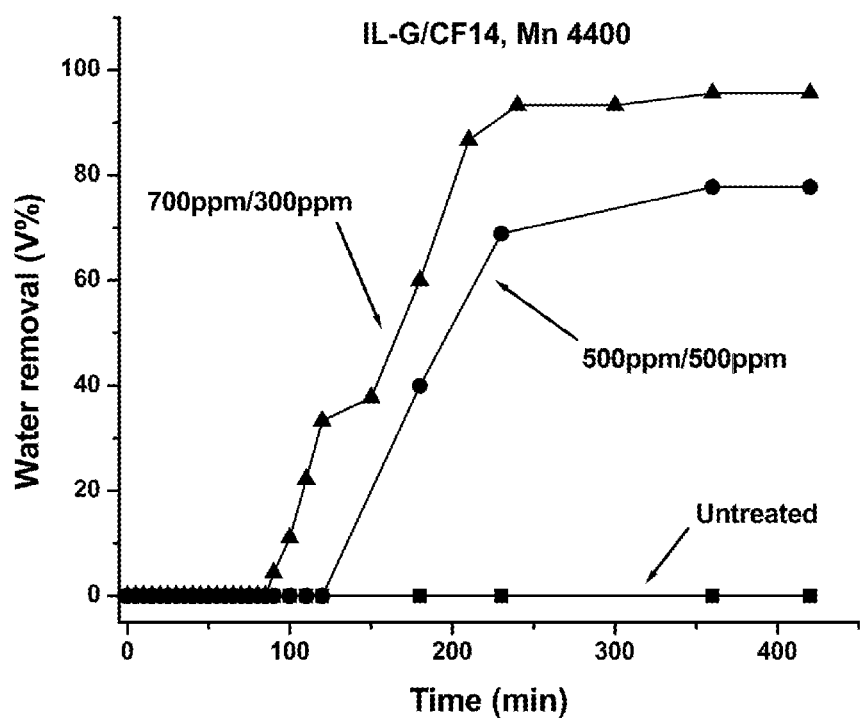
FIG. 10 is a graph of water removal rate versus time, showing the activity of the demulsifier formulation IL-G (1,2-dimethylimidazolium methylsulfate) and CF4 (Mn=2200), on crude oil type Bacab (9.2 API°).

FIG. 10 displays the demulsifier capacity of two formulations formed by IL-G and CF-14 (Mn=4400 Daltons), these formulations were added in different concentrations. Both formulations start to break the emulsion around of the 100 minutes and show similar tendency to achieve efficiencies of around 75% (500 ppm/500 ppm) and 92% (700 ppm/300 ppm), respectively.

Efficiencies in the Salt Removal of the Crude-Oil

TABLE 3

Evaluation of desalting products and formulations in medium Crude-oil Akal type (API = 19.8, Initial content of salt: 2100 lbs/1000 bls).

| Product | % Dehydrating Efficiency | Final Content of salt Lbs/1000 bls | % Reduction |
| --- | --- | --- | --- |
| IL-A/CF14E 200 ppm/200 ppm | 91 | 225 | 89.3 |
| IL-B/CF14E 200 ppm/200 ppm | 98 | 243 | 88.4 |
| IL-A 1500 ppm | 96 | 178 | 91.5 |
| IL-B 1500 ppm | 88 | 276 | 86.9 |
| CF14E 200 ppm | 81 | 271 | 87.0 |

Table 3 shows the results of dehydrated and desalting test, it is observed that the better yields are achieved with the IL-A at a concentration of 1500 ppm, however with the formulation IL-A/CF14E similar efficiencies are obtained with the addition of lower concentrations, which clearly indicates the synergistic effect produced by the formulation.

TABLE 4

Evaluation of desalting products and formulations in heavy crude-oil mixture M + T (API = 17.1, Initial content of salt: 2600 lbs/1000 bls)

| Product | % Dehydrating Efficiency | Final content of Salt Lbs/1000 bls | % Reduction |
| --- | --- | --- | --- |
| IL-C/CF19 500 ppm/500 ppm | 85 | 262 | 89.9 |
| IL-C/CF4 500 ppm/500 ppm | 70 | 315 | 87.9 |
| IL-C 1500 ppm | 33 | 1906 | 26.7 |
| CF19 200 ppm | 35 | 2180 | 16.1 |
| CF4 200 ppm | 38 | 2090 | 19.6 |
| IMP RHS-5 1000 ppm | 0.0 | 2600 | 0.0 |

Respect to heavy crude-oil, the best result in the dehydration and desalting process are obtained with the formulations and are shown in Table 4, their efficiencies are also much better than the commercial formulation (IMP RHS-5).

TABLE 5

Evaluation of desalting products and formulations in extra-heavy crude oil Bacab type (API = 9.2, Initial content of salt: 8825 lbs/1000 bls).

| Product | % Dehydrating Efficiency | Initial content of salt Lbs/1000 bls | % Reduction |
|---|---|---|---|
| IL-D/CF14 (Mn = 4400 Da) 500 ppm/500 ppm | 78 | 900 | 89.8 |
| IL-D/CF14 (Mn = 2200 Da) 500 ppm/500 ppm | 70 | 905 | 89.7 |
| IL-D/CF17 (Mn = 2200 Da) 500 ppm/500 ppm | 70 | 880 | 90.0 |
| IL-D/CF19 (Mn = 2200 Da) 500 ppm/500 ppm | 80 | 826 | 90.6 |
| IL-E/CF19 (Mn = 2800 Da) 500 ppm/500 ppm | 60 | 1100 | 87.5 |
| IL-F/CF4 (Mn = 2200 Da) 700 ppm/300 ppm | 70 | 950 | 89.2 |
| IL-F/CF4 (Mn = 2200 Da) 500 ppm/500 ppm | 68 | 962 | 89.1 |
| IL-G/CF14 (Mn = 4400 Da) 700 ppm/300 ppm | 92 | 513 | 94.2 |
| IL-G/CF14 (Mn = 4400 Da) 500 ppm/500 ppm | 75 | 845 | 90.4 |
| CF14 (Mn = 4400 Da) 500 ppm | 55 | 3120 | 64.6 |
| CF14 (Mn = 2200 Da) 500 ppm | 44 | 3500 | 60.3 |
| CF17 (Mn = 2200 Da) 500 ppm | 40 | 3310 | 62.5 |
| CF19 (Mn = 2200 Da) 500 ppm | 40 | 3255 | 63.1 |
| CF19 (Mn = 2800 Da) 500 ppm | 17 | 5650 | 36.0 |
| CF4 (Mn = 2200 Da) 500 ppm | 36 | 4100 | 53.5 |
| IL-D 500 ppm | 20 | 6010 | 31.9 |
| IL-E 500 ppm | 10 | 7800 | 11.6 |
| IL-F 500 ppm | 35 | 3960 | 55.1 |

Table 5 shows that the greatest efficiency in the dehydrated and therefore in the desalting of crude oil were obtained with the formulations of CF's and IL's Bibliography Al-Sabagh A M, Badawi A M and Noor El-Den M. R. (2002) Breaking water-in-crude-oil emulsion by novel demulsifiers based on maleic anhydride-oleic acid aduct. *Pet. Sci. Technol.* 20 887-914.

Cendejas G, Flores E A, Castro L V, Estrada A, Lozada M, Vázquez FS (2008) Formulaciones desemulsificantes y deshidratantes para crudos pesados a base de copolímeros en bloques bifuncionalizados con aminas, Mx/a/2008/015756.

Cendejas G, Flores E A, Castro L V, Estrada A, Lozada M, Vázquez FS (2010) Demulsifying and dehydrating formulations for heavy crude oils base on block copolymers bifunctionalized with amines, US 2010/0140141 A1

Flores E A, Castro L V, Lopez A, Hernandez J G, Alvarez F, Vazquez F S, Estrada A, Lozada M. Deshidratación y desalado de crudos medios, pesados y extrapesados utilizando líquidos iónicos y sus formulaciones. Solicitud de patente mexicana (IMP-959, MX/a/2011/003848).

Elfers G, Sager W, Vogel HH and Oppenlaender K. Oil demulsifiers base done an alkoxylate and preparation of this alkoxylate. U.S. Pat. No. 5,401,439 (1995)

Lang F T. Phosphoric ester demulsifier composition. US 2006/0036057 A1

Newman S P, Hahn C and McClain R D Enviromentally friendly demulsifiers for crude oil emulsions. US 2009/0259004

Varadaraj R and Brons C H. Aromatic sulfonic acid demulsifier of crude oil. WO 200202072737

Wang W. Hydroxy polyesters and uses as biodegradable demulsifiers. US 2008/0207780

Williams D E. Anhydride demulsifier formulations for resolving emulsion of wáter and oil. US 2009/0306232.

What is claimed is:

1. A method of demulsifying, dehydrating and desalting light, medium, heavy and extra-heavy crude oils having an API gravity of 8 to 30° API comprising the step of
combining the crude oil and a formulation in an amount of 5 to 3000 ppm based on the amount of crude oil effective for demulsifying the crude oil and forming a mixture, said formulation comprising a mixture of (a) a poly(ethyleneoxide) poly(propyleneoxide) poly(ethyleneoxide) copolymer having a molecular weight of 400 to 4400 Daltons and a polydispersity of 1.02 to 1.5 and bifunctionalized with an amine, and a synergistic amount of (b) an ionic liquid having a cation selected from the group consisting of 1,5-dicarboxy-pentane-2-ammonium, pyridinium, isoquinolinium, imidazolium, ammonium and ammonium carboxymethane, and an anion selected from the group consisting of $R_5COO^-$, $Cl^-$, $Br^-$, $[BF_4]^-$, $[PF_6]^-$, $[SbF_6]^-$, $[R_6SO_4]^-$, $[OTs]^-$, $[OMs]^{31}$, where $R_5$ is an alkyl, cycloalkyl, benzyl, alkenyl, aromatic, or allyl-functionalized chain having 1 and 18 carbon atoms; and $R_6$ is methyl or ethyl, and mixing the resulting mixture for a time sufficient to demulsify, dehydrate and desalt the crude oil.

2. The method of claim 1, wherein said amine is selected from the group consisting of a C-5 or C-6 heterocyclic amine having an oxygen or nitrogen heteroatom, and an acyclic group substituted with an aliphatic or aromatic group.

3. The method of claim 1, wherein said block copolymer and ionic liquid are present in an amount of 1 to 50% by weight based on the total weight of the formulation and where said formulation further contains a solvent having a boiling point of 30° C. to 200° C.

4. The method of claim 3, wherein said solvent is selected from the group consisting of dichloromethane, chloroform, benzene, toluene, xylenes, jet fuel, naphtha and linear and branched $C_1$ to $C_8$ alcohols.

5. The method of claim 1, wherein said poly(ethyleneoxide) poly(propyleneoxide) poly(ethyleneoxide) copolymer and said ionic liquid are mixed with said crude oil in an amount of 50 to 1500 ppm based on the amount of the crude oil.

6. The method of claim 1, wherein said poly(ethyleneoxide) poly(propyleneoxide) poly(ethyleneoxide) copolymer and said ionic liquid are mixed with said crude oil in an amount of 100 to 1000 ppm based on the amount of the crude oil.

7. The method of claim 1, wherein said copolymer has a molecular weight of 1000-4000.

8. The method of claim 1, wherein said copolymer has a molecular weight of 400-800.

9. The method of claim 1, wherein said copolymer and said ionic liquid are present in substantially equal amounts in said formulation.

10. The method of claim 1, wherein said copolymer and ionic liquid are added in an amount of 50-1500 ppm.

11. The method of claim 1, wherein said copolymer and ionic liquid are added in an amount of 200-500 ppm.

12. A method of desalting light, medium, heavy and extra-heavy crude oils having an API gravity of 8 to 30° API comprising the step of
combining a formulation to crude oil in need of desalting in an amount of 5 to 3000 ppm based on the amount of crude oil effective for desalting the crude oil and forming a mixture, said formulation comprising a mixture of (a) a poly(ethyleneoxide) poly(propyleneoxide) poly(ethyleneoxide) copolymer having a molecular weight of 400 to 4400 Daltons and a polydispersity of 1.02 to 1.5 and bifunctionalized with an amine, and a synergistic amount of (b) an ionic liquid having a cation selected from the group consisting of 1,5-dicarb oxy-p entane-2-ammonium, pyridinium, isoquinolinium, imidazolium, ammonium and ammonium carboxymethane, and an anion selected from the group consisting of $R_5COO^-$, $Cl^-$, $Br^-$, $[BF_4]^-$, $[PF_6]^-$, $[SbF_6]^-$, $[R_6SO_4]^-$, $[OTs]^-$, $[OMs]^-$, where $R_5$ is an alkyl, cycloalkyl, benzyl, alkenyl, aromatic, or allyl-functionalized chain having 1 and 18 carbon atoms; and $R_6$ is methyl or ethyl, and
mixing the resulting mixture for a time sufficient to desalt the crude oil.

13. The method of claim 12, wherein said copolymer has a molecular weight of 1000-4000.

14. The method of claim 12, wherein said copolymer has a molecular weight of 400-800.

15. The method of claim 12, wherein said copolymer and said ionic liquid are present in substantially equal amounts in said formulation.

16. The method of claim 12, wherein said copolymer and ionic liquid are added in an amount of 50-1500 ppm.

17. The method of claim 12, wherein said copolymer and ionic liquid are added in an amount of 200-500 ppm.

18. A method of demulsifying, dehydrating and desalting light, medium, heavy and extra-heavy crude oils having an API gravity of 8 to 30° API comprising the step of
combining the crude oil and a formulation in an amount of 5 to 3000 ppm based on the amount of crude oil effective for demulsifying the crude oil and forming a mixture, said formulation comprising a mixture of (a) a poly(ethyleneoxide) poly(propyleneoxide) poly(ethyleneoxide) copolymer having the formula

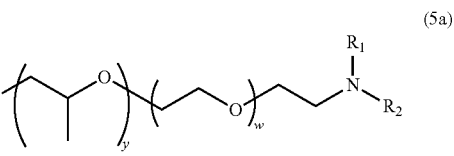

(5a)

where:
w and y numbers are in the range of 10 to 60;
$R_1$ and $R_2$ radicals are independently represented by the groups
—H; —$CH_2(CH_2)_4B$; —CEGJ; —$CH_2CHLM$; —$CH_2(CH_2)_QM$;

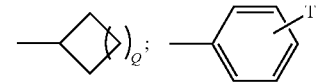

where: A is a number between 1 and 11, B is H;
E, G and J are independently a radical selected from the group consisting of: —H, methyl, ethyl, n-propyl, iso-propyl, sec-butyl, iso-butyl, tent-butyl, n-butyl, phenyl, cyclohexyl and cyclopentyl;
L is a radical represented by methyl and ethyl, and M is a hydroxyl group;
Q is a number between 1 and 5; T is a radical selected from the group consisting of: —H, methyl, ethyl, n-propyl, iso-propyl, sec-butyl, iso-butyl, tent-butyl, n-butyl, phenyl, cyclohexyl, cyclopentyl, $NO_2$, Cl, F and Br; or

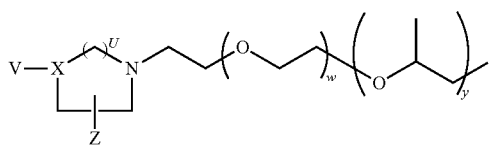

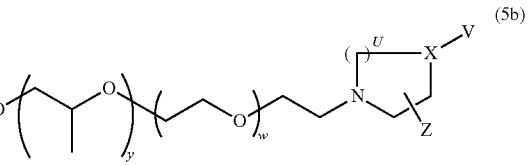

(5b)

where
w and y are as defined in Formula 5a;
U is a number between 1 and 2;
X is oxygen or nitrogen, when X is nitrogen then V is selected from the group consisting of methyl, ethyl, n-propyl, iso-propyl, sec-butyl, iso-butyl, tert-butyl, n-butyl, phenyl, cyclohexyl, cyclopentyl, and benzyl;

Z is a mono- or di-substitution and is selected from the group consisting of methyl, ethyl, n-propyl, iso-propyl, sec-butyl, iso-butyl, tert-butyl, n-butyl, phenyl, cyclohexyl, cyclopentyl, benzyl and hydroxyl; and a synergistic amount of (b) an ionic liquid having a cation selected from the group consisting of 1,5-dicarboxy-pentane-2-ammonium, pyridinium, isoquinolinium, imidazolium, ammonium and ammonium carboxymethane, and an anion selected from the group consisting of $R_5COO^-$, $Cl^-$, $Br^-$, $[BF_4]^{31}$, $[PF_6]^-$, $[SbF_6]^-$, $[R_6SO_4]^{31}$, $[OTs]^-$, $[OMs]^-$, where $R_5$ is an alkyl, cycloalkyl, benzyl, alkenyl, aromatic, or allyl-functionalized chain having 1 and 18 carbon atoms; and $R_6$ is methyl or ethyl, and mixing the resulting mixture for a time sufficient to demulsify, dehydrate and desalt the crude oil.

19. The method of claim 18, wherein said ionic liquid is selected from the group consisting of triethylammonium methanesulfonate, ethyltrihexylammonium bromide, 1,5-dicarboxy-pentane-2-ammonium methanesulfonate, methyltripentylammonium bromide, ethyltributylammonium ethylsulfate, ethyldodecylimidazolium chloride, and 1,2-dimethylimidazolium methylsulfate.

20. The method of claim 18, wherein said copolymer has a molecular weight between 2200 and 4400 Dalton.

21. The method of claim 20, wherein said formulation is selected from the group consisting of
   a mixture of 1,5-dicarboxy-pentane-2-ammonium methanesulfonate and said copolymer having a molecular weight of 2200 Dalton;
   a mixture of methyltripentylammonium bromide and a copolymer having said molecular weight of 4400 Dalton; and
   a mixture of methyltripentylammonium bromide and said copolymer having a molecular weight of 2200 Dalton.

* * * * *